US010265618B2

(12) United States Patent  
Park (10) Patent No.: US 10,265,618 B2  
(45) Date of Patent: Apr. 23, 2019

(54) DEVICE, METHOD, COMPUTER PROGRAM, AND READER FOR PROVIDING GAME SERVICE

(71) Applicant: VISUALSHOWER CORP., Gangnam-gu, Seoul (KR)

(72) Inventor: Hong Kwan Park, Seoul (KR)

(73) Assignee: VISUALSHOWER CORP., Seoul (KR)

( * ) Notice: Subject to any disclaimer, the term of this patent is extended or adjusted under 35 U.S.C. 154(b) by 0 days.

(21) Appl. No.: 15/579,877

(22) PCT Filed: Jun. 7, 2016

(86) PCT No.: PCT/KR2016/005969  
§ 371 (c)(1),  
(2) Date: Dec. 5, 2017

(87) PCT Pub. No.: WO2016/195443  
PCT Pub. Date: Dec. 8, 2016

(65) Prior Publication Data  
US 2018/0161669 A1 Jun. 14, 2018

(30) Foreign Application Priority Data

Jun. 5, 2015 (KR) .................. 10-2015-0080032  
Jun. 5, 2015 (KR) .................. 10-2015-0080033

(51) Int. Cl.  
*A63F 13/20* (2014.01)  
*A63F 13/65* (2014.01)  
(Continued)

(52) U.S. Cl.  
CPC .............. *A63F 13/20* (2014.09); *A63F 13/49* (2014.09); *A63F 13/65* (2014.09); *A63F 13/70* (2014.09);  
(Continued)

(58) Field of Classification Search  
None  
See application file for complete search history.

(56) References Cited

U.S. PATENT DOCUMENTS

2012/0258788 A1 10/2012 Hong  
2014/0310767 A1* 10/2014 Nishimura .............. H04L 63/20  
726/1

(Continued)

FOREIGN PATENT DOCUMENTS

JP 2013502971 1/2013  
KR 20030091635 12/2003  
(Continued)

OTHER PUBLICATIONS

International Search Report, International Application No. PCT/KR2016/005969, dated Aug. 29, 2016.

*Primary Examiner* — Ronald Laneau  
(74) *Attorney, Agent, or Firm* — Perman & Green, LLP (57) ABSTRACT

A device, a method, and a computer program for providing a game service. The device for providing a game service, changes the level of a reader by using a level change source, and includes a communication unit for receiving reader recognition information of the reader and/or level change source recognition information of the level change source, an account managing unit for changing the level of the reader on the basis of the reader recognition information and the level change source recognition information, and a database for saving information related to the reader.

5 Claims, 9 Drawing Sheets

(51) Int. Cl.
  *A63F 13/49*   (2014.01)
  *A63F 13/79*   (2014.01)
  *A63F 13/70*   (2014.01)
  *A63F 13/73*   (2014.01)
  *A63F 13/335*  (2014.01)
  *A63F 13/92*   (2014.01)

(52) U.S. Cl.
  CPC .............. *A63F 13/73* (2014.09); *A63F 13/79* (2014.09); *A63F 13/335* (2014.09); *A63F 13/92* (2014.09)

(56) References Cited

U.S. PATENT DOCUMENTS

2018/0039973 A1\* 2/2018 Bishop ................ G06Q 20/385
2018/0114040 A1\* 4/2018 Park ........................ G06K 7/01

FOREIGN PATENT DOCUMENTS

| KR | 20040066777 | 7/2004 |
| KR | 20080085107 | 9/2008 |
| KR | 20090000715 | 1/2009 |
| WO | 2008117959  | 10/2008 |
| WO | 2011025249  | 3/2011 |

\* cited by examiner

DEVICE, METHOD, COMPUTER PROGRAM, AND READER FOR PROVIDING GAME SERVICE

CROSS REFERENCE TO RELATED APPLICATIONS

This application is the National Stage of International Application No. PCT/KR2016/005969, having an International Filing Date of 7 Jun. 2016, which designated the United States of America, and which International Application was published under PCT Article 21 (2) as WO Publication No. 2016/195443 A1, and which claims priority from and the benefit of Korean Application No. 10-2015-0080032, filed on Jun. 5, 2015 the disclosures of which are incorporated herein by reference in their entireties.

BACKGROUND

1. Field

Aspects of the presently disclosed embodiment relate to a device, a method, a computer program, and a reader for providing a game service.

2. Brief Description of Related Developments

Online game items are tools that exist on games in various ways so as to add pleasure to users enjoying games through the Internet by wire or by wireless.

Such items are traded online and are traded offline in the form of cards, toys, and the like. Various methods of acquiring items traded in the form of cards, toys, and the like on online games are being developed.

SUMMARY

Aspects of the presently disclosed embodiment provide a device, a method, a computer program, and a reader for providing a game service.

A device for providing a game service, according to an aspect of the presently disclosed embodiment, changes a level of a reader by using a level change source and includes a communicator that receives at least one of reader recognition information of the reader and level change source recognition information of the level change source, an account manager that changes the level of the reader based on the reader recognition information and the level change source recognition information, and a database that stores information about the reader.

According to aspects of the presently disclosed embodiment, a device, a method, a computer program, and a reader for providing a game service can be provided.

DETAILED DESCRIPTION

The advantages and features of the presently disclosed embodiment and methods for achieving the same will become apparent from the following aspects that are described in detail in conjunction with the accompanying drawings. However, it should be understood that these aspects are not construed as limited to the illustrated forms and include all changes, equivalents, or alternatives within the idea and the technical scope of the presently disclosed embodiment. The following aspects are provided so that this disclosure will be thorough and complete, and will fully convey the scope of the disclosed embodiment to those skilled in the art. In the following descriptions, descriptions of well-known functions and constructions will be omitted if they are considered to unnecessarily obscure the gist of the presently disclosed embodiment.

The terminology used herein is for the purpose of describing particular aspects only and is not intended to limit the scope of the presently disclosed embodiment. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof. It will be understood that although the terms "first", "second", etc. may be used herein to describe various components, these components should not be limited by these terms. These components are only used to distinguish one component from another.

The terms "communication", "communication network", "Internet network", and "network" used herein may be used as the same meaning. The above terms mean a wired or wireless local and wide area data transmission and reception network that enables files to be transmitted and received between a user terminal, terminals of other users, and a download server.

In the present specification, when one component "transmits" data to another component, it means that the component may transmit the data directly to the other component, or may transmit the data to the other component through at least one other component.

In contrast, when one component "directly transmits" data to another component, it means that the data is transmitted to the other component without passing through another component.

The terms "unit" and "module" used herein may mean a functional and structural combination of hardware for performing the technical spirit of the presently disclosed embodiment and software for driving the hardware. For example, the term "module" may mean a logical unit of predetermined codes and hardware resources for performing the predetermined codes, and it will be apparent to those skilled in the art that the module is not limited to physically connected codes or one type of hardware.

Hereinafter, aspects of the presently disclosed embodiment will be described in detail with reference to the accompanying drawings, and in the drawings, like reference numerals denote like elements, and a redundant explanation thereof will not be provided herein.

Figure 1:
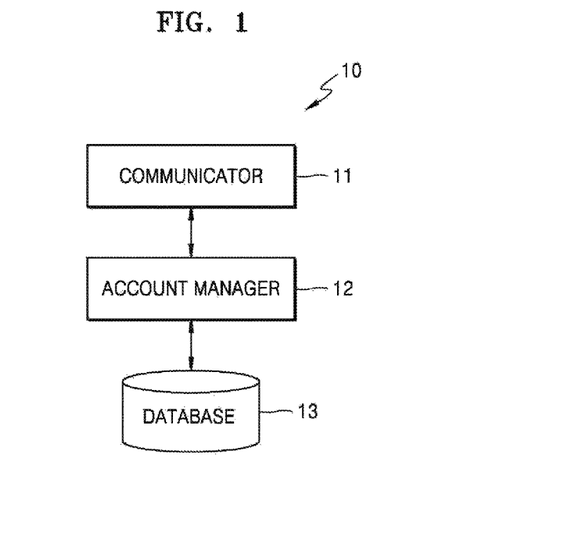
FIG. 1 is a block diagram schematically illustrating a game service providing device according to an aspect of the presently disclosed embodiment.

FIG. 1 is a block diagram schematically illustrating a game service providing device according to an aspect of the presently disclosed embodiment.

Referring to FIG. 1, the game service providing device 10 according to the aspect of the presently disclosed embodiment includes a communicator 11, an account manager 12, and a database 13. The game service providing device 10 changes a level of a reader by using a level change source.

The communicator 11 receives at least one of payment code readout information of the reader, login information based on reader recognition information, and level change source recognition information.

The payment code readout information may include transaction information such as transaction identification information, affiliate code, product information, and transaction amount.

The transaction identification information is a unique transaction number generated when an approval request for transaction is made to a financial server. The transaction identification information is used for transaction inquiry or error tracking and is needed to cancel the transaction.

The affiliate code is a combination of alphabets and/or numbers assigned to the affiliate and is used to distinguish an affiliate at the time of transaction processing.

The product information is a code for identifying a product, and one piece of payment code readout information may include product information about at least one reader, such as reader identification information identifying a reader.

The login information include game identification information, user identification information, and the like based on the reader recognition information.

The level change source recognition information may include at least one of identification information and number information of a level change source.

The communicator 11 communicates with the user terminal to transmit and receive packet data. The communicator 11 may receive identification information of the card reader 200 from the user terminal and receive readout information from a card to be read by using the card reader 200.

The identification information of the card reader 200 is unique identification information assigned to each card reader 200 existing in kind, and is information used for specifying the card reader 200. Information about the card reader 200, for example, user account information linked to the card reader 200, level information of the card reader 200, or the like, may be stored in the database 13 in association with the identification information of the card reader 200.

The database 13 may store a card reader account, may include a plurality of fields for the card reader account, and may store a card reader identification number, user account information linked to the card reader, card reader level information, and the like in each field. A level may be assigned to the card reader 200, and the level of the card reader 200 may be changed by a level change source (see 50 of FIG. 4). For example, the level change source (see 50 of FIG. 4) may be a reinforced stone or the like including a function capable of changing the level of the card reader 200.

The user may progress a game by utilizing the card read by using the card reader 200, and the level of the card reader 200 may influence the progress of the game. For example, the level of the card reader 200 may determine performance of an item included in the card, or may determine a level change success rate when a level of a target card is changed by using a source card.

The communicator 11 transmits at least one of reader account registration notification, a latest game execution screen, and reader level change display information.

The communicator 11 may transmit a reader account registration notification corresponding to payment code readout information to a payment code reader that has generated and transmitted the payment code readout information. The reader account may mean a work area including at least one field for storing reader related information.

The communicator 11 may transmit a latest game execution screen displaying latest game execution information corresponding to login information to a terminal that has generated and transmitted the login information based on reader recognition information. The login information may include at least one of game identification information and user identification information. The latest game execution information may mean game execution information at the time of the latest logout from a current time point.

The communicator 11 may transmit reader level change display information corresponding to level change source recognition information to a terminal that has transmitted the level change source recognition information. The reader level means the level of the reader itself. For example, the reader level may be automatically changed when an experience value according to a history of a game performed by a user in a state in which the reader is connected is accumulated and becomes a predetermined value, or may be changed by an external input. Hereinafter, a case where the reader level is changed by an external input such as level change source recognition, according to aspects of the presently disclosed embodiment, will be described in more detail.

The account manager 12 registers a reader account corresponding to a reader based on payment code readout information received through the communicator 11.

For example, the account manager 12 may register a reader account corresponding to at least one reader based on payment code readout information including product information for at least one reader. The account manager 12 may register the reader account by generating a field storing information about the reader in the database 13 to be described below. The field may mean a predetermined data storage designation region in a storage region of the database 13 to be described below.

According to an embodiment, the account manager 12 may generate at least one of a reader identification information field and a reader level information field in the database 13 to be described below.

For example, when the communicator 11 receives payment code readout information including reader identification information, the account manager 12 may register a reader account corresponding to a reader based on the payment code readout information, and store first reader identification information in a reader identification information field linked to the reader account, or store first reader level information, for example, default information, in a reader level information field.

The account manager 12 changes the level of the reader based on reader recognition information and level change source recognition information.

According to an aspect, the account manager 12 may change the level of the reader by storing newly changed reader level information in a reader level information field based on the reader recognition information and the level change source recognition information.

That is, the account manager 12 may generate new reader level information of the reader based on the reader recognition information and the level change source recognition information. The account manager 12 may specify a reader of which a level is to be changed, based on reader recognition information, and find a current reader level of the specified reader. The account manager 12 may find the current reader level of the reader from the reader recognition information, and may find the current reader level of the reader from information stored in the reader level information field of the reader account corresponding to the specified reader, but aspects of the presently disclosed embodiment are not limited thereto. The account manager 12 may specify a level change source based on the level change source recognition information, and generate newly changed reader level information by applying the specified level change source to the current reader level of the specified reader. At this time, the account manager 12 may specify the level change source by extracting the type and the number of level change sources from the level change source recognition information. Then, the account manager 12 may store newly changed reader level information in the reader level information field of the reader account.

For example, based on the reader recognition information, the account manager 12 may find that the reader of which the level is to be changed is a first reader, and a current reader level of the first reader is a default level. The account manager 12 may acquire one level-1 change source based on the level change source recognition information, and generate second reader level information indicating level 1 by applying the level-1 change source to the default level of the first reader. Alternatively, the account manager 12 may acquire a plurality of level-1 change sources, for example, four level-1 change sources, based on the level change source recognition information, and generate second reader level information indicating level 4 by applying the level-4 change source to the default level of the first reader. The account manager 12 may store second reader level information in a reader level information field of a first reader account.

The account manager 12 may generate reader level change display information after storing the second reader level information in the reader level information field.

The database 13 stores information about the reader. The information about the reader may include at least one of reader identification information identifying the reader and reader level information indicating the current level of the reader.

Figure 2:
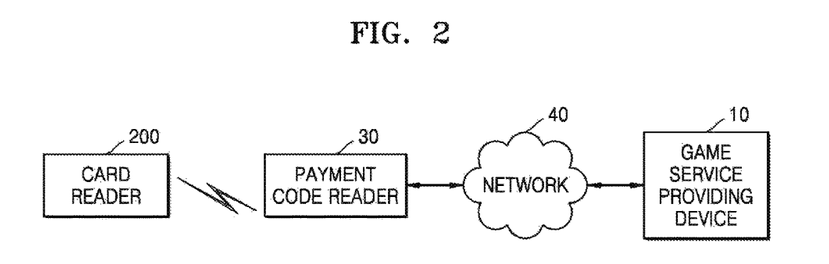
FIG. 2 is a diagram for describing a relationship between a card reader, a payment code reader, and a game service providing device, according to an aspect of the presently disclosed embodiment.

FIG. 2 is a diagram for describing a relationship between a card reader, a payment code reader, and a game service providing device, according to an aspect of the presently disclosed embodiment.

Referring to FIG. 2, the game service providing device 10 according to the aspect of the presently disclosed embodiment may be connected to a payment code reader 30 via a network 40 including a wired and/or wireless communication network such as Internet and/or Intranet. That is, the game service providing device 10 may be distinguished from the payment code reader 30 and may be connected to the network 40 in a state of being separated from the payment code reader 30.

The payment code reader 30 reads a payment code provided in a card reader 200, and generates payment code readout information including transaction information such as transaction identification information, affiliate code, product information, and transaction amount.

The above-described reader may be connected to a terminal that provides a game service, and may read game objects available on the game service, for example, a game character card or a game item card. Hereinafter, the card reader 200 read by the payment code reader 30, according to an aspect of the presently disclosed embodiment, will be described in detail with reference to FIG. 3. The description of the card reader 200 that reads the game character card or the game item card can be applied to any readers reading game objects other than the card.

Figure 3:
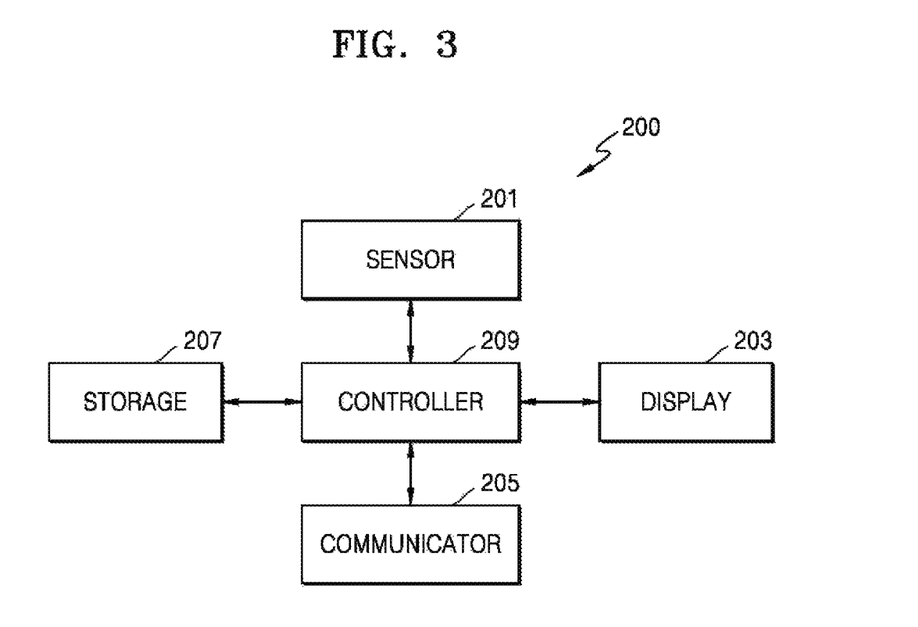
FIG. 3 is a block diagram schematically illustrating a card reader according to an aspect of the presently disclosed embodiment.

FIG. 3 is a block diagram schematically illustrating a card reader according to an aspect of the presently disclosed embodiment.

Referring to FIG. 3, the card reader 200 according to the aspect of the presently disclosed embodiment includes a sensor 201, a display 203, a communicator 205, a storage 207, and a controller 209.

The sensor 201 recognizes a level change source. Hereinafter, the sensor 201 recognizing the level change source in a contact manner, according to an aspect of the presently disclosed embodiment, will be described in detail with reference to FIGS. 4 and 5.

Figure 4:
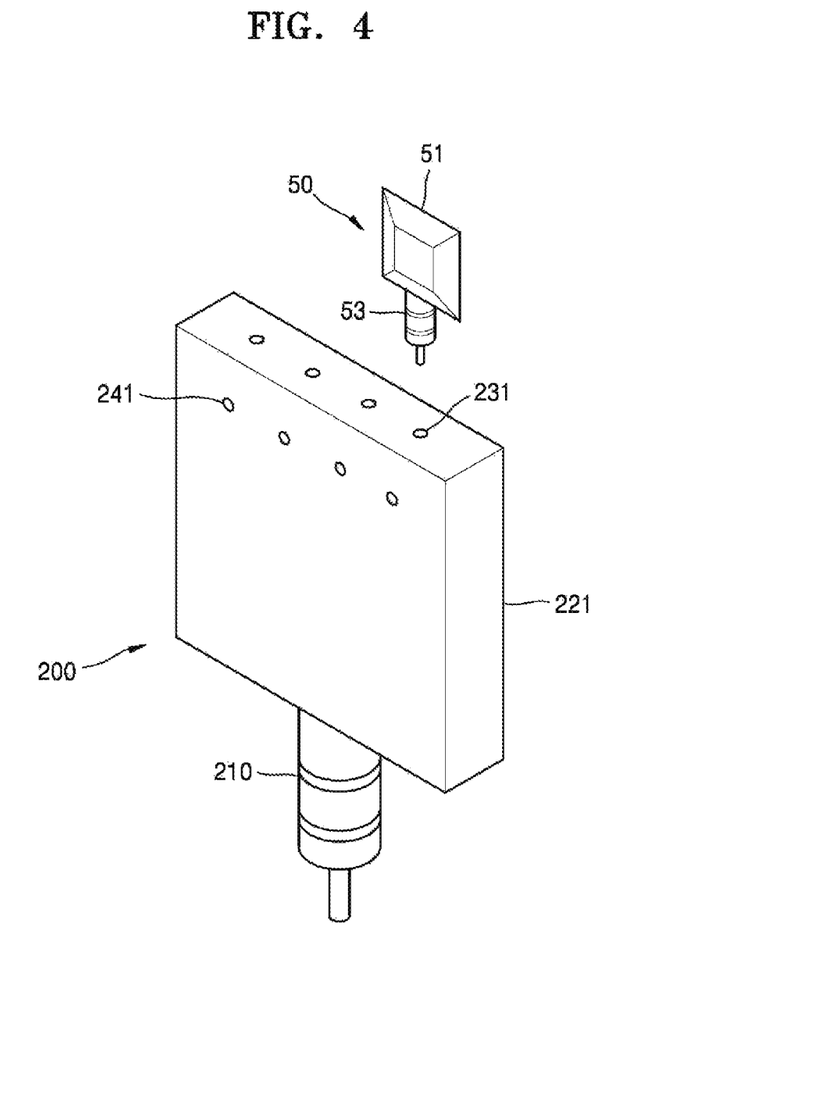
FIG. 4 is a diagram schematically illustrating a card reader according to an aspect of the presently disclosed embodiment.

FIG. 4 is a diagram schematically illustrating a card reader according to an aspect of the presently disclosed embodiment.

Referring to FIG. 4, the card reader 200 includes a connector 210, a main body 221, a level change source jack 231, and a level change source recognition indicator 241.

The connector 210 is attached to the main body 221 and transmits card reader recognition information, level change source recognition information, and the like through a connection port of a terminal. The connection port of the terminal may include a microphone connection terminal, an earphone connection terminal, or the like. The connector 210 may have a size appropriate for the standard of the connection port of the terminal.

The level change source jack 231 is an embodiment of the sensor 201 constituting the card reader 200 and is formed at one side of the main body 221. The level change source jack 231 may be connected to a level change source plug 53 so as to recognize the level change source. The level change source plug 53 may have a size appropriate for the standard of the level change source jack 231. The level change source plug 53 may be attached to a level change source body 51 of the level change source 50 and transmit level change source recognition information to the card reader 200 through the level change source jack 231.

The level change source recognition indicator 241 is an embodiment of the display 203 constituting the card reader 200 and is formed at another side of the main body 221. The level change source recognition indicator 241 may include, for example, a light emitting diode (LED) that can flicker. When the level change source plug 53 is connected to the level change source jack 231, the level change source recognition indicator 241 may emit light to notify a level change source recognition.

Figure 5:
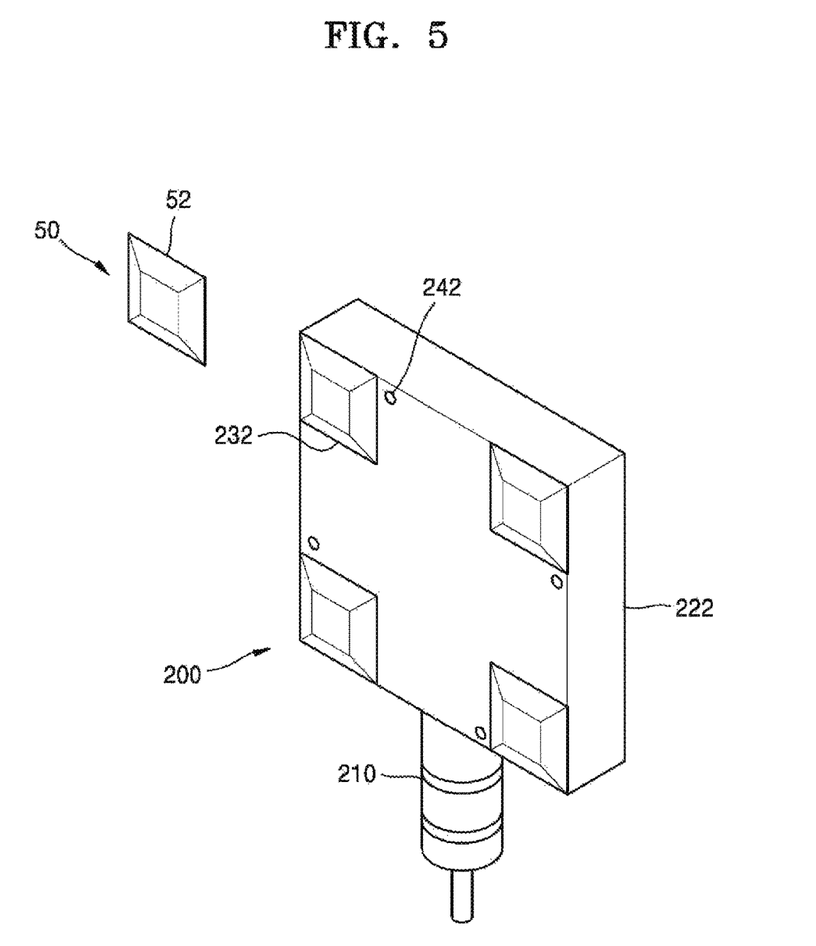
FIG. 5 is a diagram schematically illustrating a card reader according to another aspect of the presently disclosed embodiment.

FIG. 5 is a diagram schematically illustrating a card reader according to another aspect of the presently disclosed embodiment.

Referring to FIG. 5, the card reader 200 includes a connector 210, a main body 222, a level change source recess 232, and a level change source recognition indicator 242.

The connector 210 is attached to the main body 222 and transmits card reader recognition information, level change source recognition information, and the like through a connection port of a terminal.

The level change source recess 232 is another embodiment of the sensor 201 constituting the card reader 200 and is formed at one side of the main body 222. The level change source recess 232 may be formed to have a concave insertion structure to which a level change source body 52 having a convex three-dimensional structure can be connected. The level change source recess 232 may recognize the level change source 50 by detecting the shape, weight, and the like of the level change source body 52 when the level change source body 52 is connected thereto. The level change source body 52 may transmit level change source recognition information to the card reader 200 through the level change source recess 232.

The level change source recognition indicator 242 is an embodiment of the display 203 constituting the card reader 200 and is formed at one side of the main body 222.

Figure 6:
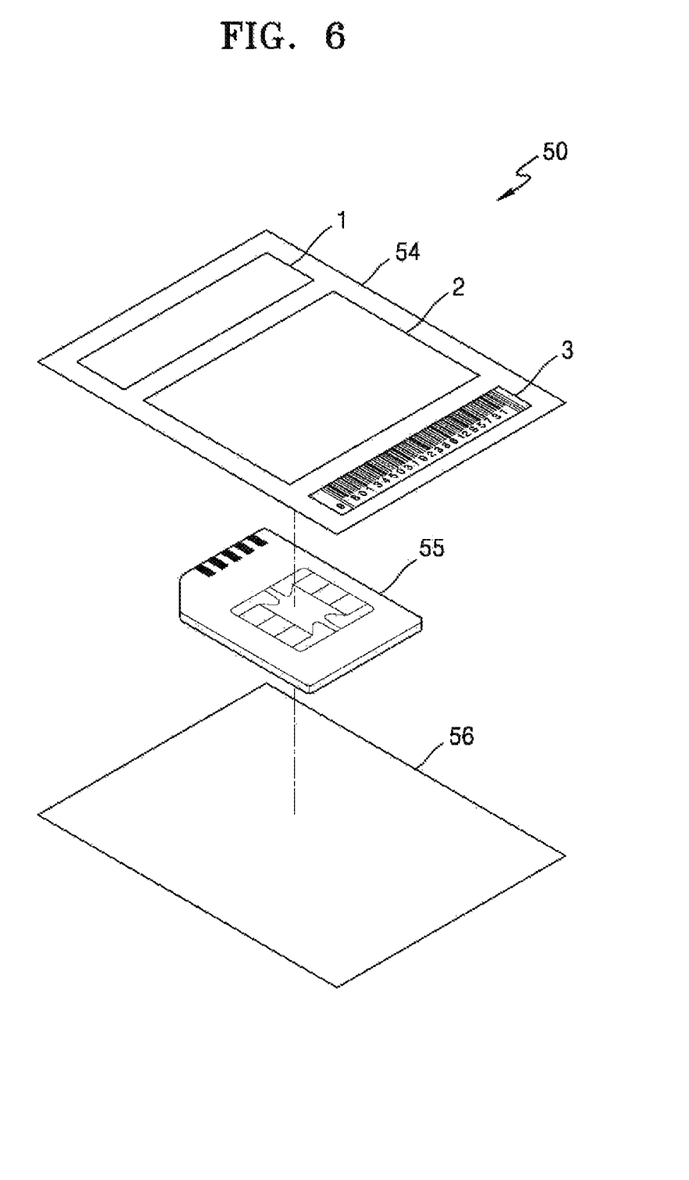
FIG. 6 is a diagram schematically illustrating a card read by a card reader, according to an aspect of the presently disclosed embodiment.

FIG. 6 is a diagram schematically illustrating a card read by a card reader, according to an aspect of the presently disclosed embodiment.

Referring to FIG. 6, a level change source 50, which is implemented by a card, includes at least one radio frequency module 55 between two outer covers 54 and 56.

The outer covers 54 and 56 may be papers, plastics, or the like, but are not limited thereto. An item title 1, an item image 2, a payment code 3, and the like may be displayed on the first outer cover 54. The item title 1 may include characters, numbers, symbols, and the like indicating an item or a game service in which the item is used. The item image 2 may include an image of an item displayed on the game service.

The payment code 3 is readable by the payment code reader 30. The payment code 3 may be a two-dimensional code such as a QR code or a barcode, an IC chip, and the like, but is not limited thereto. The payment code reader 30 may read the payment code 3 displayed on the outer covers 54 and 56 and generate payment code readout information of the card, or may read a payment code displayed on an outer cover of a card bundle (not illustrated) including the card and generate payment code readout information of the card bundle (not illustrated).

The radio frequency module 55 is readable by the sensor 201 of the card reader 200. The payment code 3 and the radio frequency module 55 may be read by different readers.

The radio frequency module 55 operates in a predetermined radio frequency band. A plurality of radio frequency modules included in a plurality of cards may operate in different radio frequency bands, and the sensor 201 may simultaneously read the radio frequency modules of the respective cards constituting the card bundle (not illustrated).

The radio frequency module 55 of the card, according to an aspect of the presently disclosed embodiment, may include the level change source of the card reader 200, according to the aspects of the presently disclosed embodiment.

A radio frequency module 55 of a card, according to another aspect of the presently disclosed embodiment, may include objects (for example, characters, items, cash, and the like) available on the game service providing device 10 according to the aspects of the presently disclosed embodiment According to an aspect of the presently disclosed embodiment, the reading of the radio frequency module 55 by the sensor 201 is meaningful only when the payment code 3 is read by the payment code reader 30 to generate payment code readout information, and the card account corresponding to the card is generated based on the payment code readout information. When the payment code 3 is not read by the payment code reader 30, when the payment code readout information is not generated, or when the card account corresponding to the card is not generated based on the payment code readout information, even if the radio frequency module 55 is read by the sensor 201, items cannot be used online based thereon.

That is, the game service providing device 10 according to the aspect of the presently disclosed embodiment may perform control to acquire items available online with respect to only the card that has been purchased.

Figure 7:
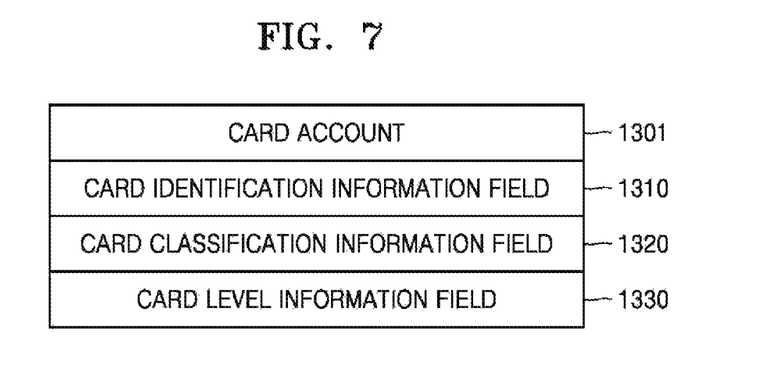
FIG. 7 is a diagram for describing a card account generated by a game service providing device, according to an aspect of the presently disclosed embodiment.

FIG. 7 is a diagram for describing a card account generated by a game service providing device, according to an aspect of the presently disclosed embodiment.

Referring to FIG. 7, when the payment code reader 30 transmits payment code readout information to the game service providing device 10 via the network 40, the game service providing device 10 generates a card account 1301 corresponding to a card based on the payment code readout information.

When the card account 1301 is generated according to the aspect of the presently disclosed embodiment, at least one of a card identification information field 1310, a card classification information field 1320, and a card level information field 1330 of the newly generated card account 1301 may be generated in the storage region of the database 13.

The card identification information field 1310 may store card identification information identifying the card, the card classification information field 1320 may store card classification information indicating whether the card is a level change source card, and the card level information field 1330 may store card level information indicating a current level of the card. Although not illustrated, the card identification information field 1310 may further include an item identification information field storing item identification information identifying the item included in the card or information indicating that the card does not include the item.

For example, when first payment code readout information including card identification information is received, the game service providing device 10 according to the aspect of the presently disclosed embodiment may generate the card account 1301 corresponding to the first payment code readout information, store the card identification information, for example, a first card number, in the card identification information field 1310, store the card classification information indicating that the corresponding card is a level-up source card in the card classification information field 1320, or store first card level information indicating that the corresponding card has a value as the level change source in the card level information field 1330.

Referring to FIG. 3 again, the display 203 displays a level change source recognition notification.

The communicator 205 transmits the card reader recognition information and the level change source recognition information to the terminal.

The card reader recognition information may include at least one of card reader identification information, game identification information, and game execution information. The card reader identification information means information identifying the card reader 200. The game identification information means information identifying the game service provided by the terminal. The game execution information means information requesting the game service to be executed in the terminal. For example, even when there is no separate user input, the terminal may start the game service (for example, may activate a game application) according to the reception of the card reader recognition information included in the game execution information from the card reader 200.

The storage 207 may store at least one of the card reader identification information, the game identification information, and the game execution information.

The controller 209 controls the overall operations of the sensor 201, the display 203, the communicator 205, and the storage 207.

For example, when the card reader 200 is connected to the terminal through the connector 210, the controller 209 may transmit the card reader recognition information through the communicator 205 to the terminal.

As another example, when the sensor 201 recognizes the level change source, the controller 209 may display the level change source recognition notification through the display 203, and transmit the level change source recognition information of the card reader 200 to the terminal through the communicator 205.

Referring to FIG. 2 again, when the payment code reader 30 transmits payment code readout information to the game service providing device 10 via the network 40, the game service providing device 10 generates the card reader account corresponding to the card reader 200 based on the payment code readout information. Hereinafter, the card reader account according to an aspect of the presently disclosed embodiment will be described in more detail with reference to FIG. 8.

Figure 8:
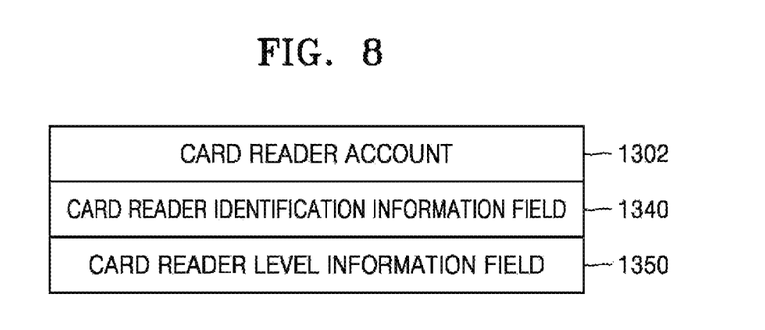
FIG. 8 is a diagram for describing a card reader account generated by a game service providing device, according to an aspect of the presently disclosed embodiment.

FIG. 8 is a diagram for describing the card reader account generated by the game service providing device, according to an aspect of the presently disclosed embodiment.

Referring to FIG. 8, when the card reader account 1302 is generated according to the aspect of the presently disclosed embodiment, at least one of a card reader identification information field 1340 and a card reader level information field 1350 of the newly generated card reader account 1302 may be generated in the storage region of the database 13.

The card reader identification information field 1340 may store card reader identification information identifying the card reader, and the card reader level information field 1350 store reader level information indicating a current level of the reader.

For example, when second payment code readout information including card reader identification information is received, the game service providing device 10 according to the aspect of the presently disclosed embodiment may generate the card reader account 1302 corresponding to the second payment code readout information, store the card reader identification information, for example, a first card reader number, in the card reader identification information field 1340, or store first card reader level information indicating a default level in the card reader level information field 1350.

Figure 9:
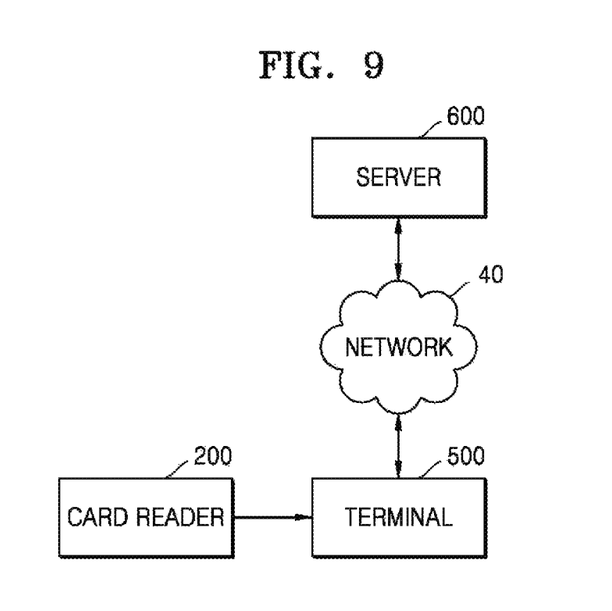
FIG. 9 is a diagram for describing a relationship between a card reader, a terminal, and a game service providing device, which perform a game service providing method, according to an aspect of the presently disclosed embodiment.

FIG. 9 is a diagram for describing a relationship between a card reader, a terminal, and a game service providing device, which perform a game service providing method, according to an aspect of the presently disclosed embodiment.

Referring to FIG. 9, the game service providing device 10 according to the aspect of the presently disclosed embodiment may be implemented in a server 600 and connected to a terminal 500 via a network 40 including a wired and/or wireless communication network such as Internet and/or Intranet. That is, the game service providing device 10 may distinguish from the terminal 500 and may be connected to the terminal via the network 40 in a state of being separated from the terminal 500.

Although not illustrated, the game service providing device 10 according to another aspect of the presently disclosed embodiment may be included in the terminal 500. There are various methods of including the game service providing device 10 of the present embodiment in the terminal 500. As a specific embodiment, each user may install the game service providing device 10 in the terminal 500 via the network 40. For example, the user may install the game service providing device 10 in the terminal 500 in the form of an application. As another specific embodiment, the game service providing device 10 may be installed in the terminal 500 via an offline. However, this is merely an example and the presently disclosed embodiment is not limited thereto. The game service providing device 10 may be installed in the terminal 500 in various forms. The terminal 500 may include the game service providing device 10 in a controller 520 illustrated in FIG. 10, and may further include the game service providing device 10 separately from the controller 520.

Although not illustrated, the game service providing device 10 according to another aspect of the presently disclosed embodiment need not be necessarily implemented by a physical device. That is, the game service providing device 10 may be implemented by organically connecting a plurality of physical devices. To this end, some of the elements included in the game service providing device 10 may be implemented or installed with one physical device, and the others thereof may be implemented or installed with another physical device. In this case, another physical device may be implemented as a part of the terminal 500.

According to implementation examples, the elements (units) included in the game service providing device 10 may be disposed in different physical devices in a distributed manner, and the elements disposed in the distributed manner may be organically connected to perform the functions and/or operations defined herein.

The card reader 200 reads a radio frequency module provided in a game character card or a game item card, and generates card readout information including at least one of card identification information, character identification information, and item identification information. The card reader 200 may be a radio frequency reader, and may simultaneously read a plurality of radio frequency modules provided in a plurality of cards and generate a plurality of pieces of card readout information.

The card reader 200 generates at least one of card reader recognition information and level change source recognition information.

The card reader 200 and the terminal 500 may be connected by wire or by wireless. For example, the card reader 200 may include a connector connected to an 8-pin port provided in the terminal 500. Although not illustrated, the card reader 200 may be provided in the terminal 500.

The terminal 500 may transmit information generated by the card reader 200 to the server 600 via the network 40, and may receive a game service providing screen such as card account generation notification or card reader level change display information transmitted from the server 600 via the network 40.

The terminal 500 may be a mobile terminal, such as a notebook, a hand-held device, a smartphone, or a tab, a desktop computer, or any appropriate devices using such devices or directly or indirectly connected thereto. Hereinafter, the terminal 500 according to an aspect of the presently disclosed embodiment will be described in more detail with reference to FIG. 10.

Figure 10:
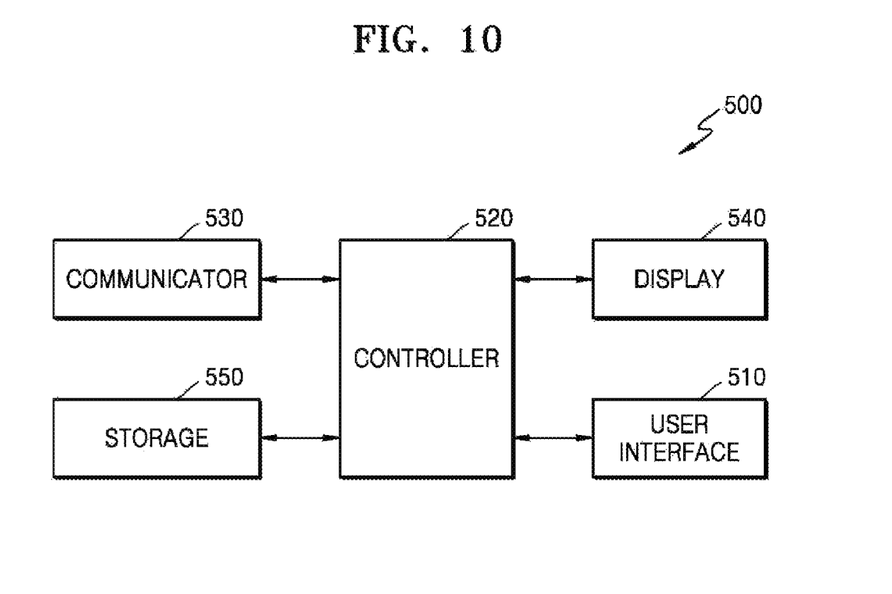
FIG. 10 is a block diagram schematically illustrating a terminal according to an aspect of the presently disclosed embodiment.

FIG. 10 is a block diagram schematically illustrating a terminal according to an aspect of the presently disclosed embodiment.

Referring to FIG. 10, the terminal 500 includes a user interface 510, a controller 520, a communicator 530, a display 540, and a storage 550.

The user interface 510 may provide an interface with a user for operation control of the terminal 500. The user interface 510 may receive a user operation signal and transmit the received user operation signal to the controller 520.

The controller 520 performs the function of controlling the overall operation of the terminal 500.

The communicator 530 communicates with the card reader 200 or the server 600. The communicator 530 may receive card reader recognition information, level change source recognition information, and the like from the card reader 200 and transmit the received information to the server 600. The communicator 530 may receive the game service providing screen, such as card account generation notification or card reader level change display information, from the server 600.

The display 540 may display, on the screen, the card account generation notification or the card reader level change display information received from the server 600. The display 540 may include at least one of a liquid crystal display (LCD), an organic light-emitting display (OLED), an electrophoretic display (EPD), a flexible display, and a three-dimensional (3D) display. Two or more displays 540 may be provided according to an implementation type of the terminal 500.

The storage 550 may store card reader recognition information, login information, level change source recognition information, latest game execution information, and card reader level change display information.

The storage 550 may include at least one storage medium selected from among flash memory, hard disk, multimedia card micro type memory, card type memory (e.g., SD or XD memory), random access memory (RAM), and read-only memory (ROM). Also, the storage 550 may include a virtual space of a cloud environment connected by wire and/or by wireless, like a web storage that performs a storing function on the Internet.

Figure 11:
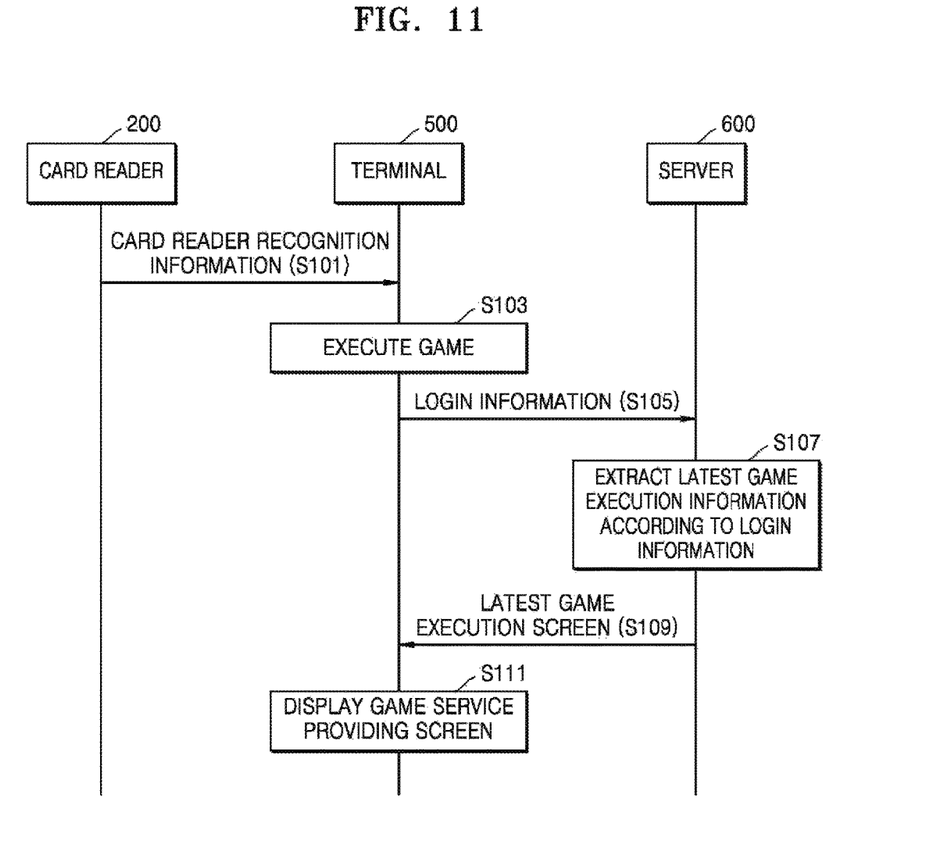
FIG. 11 is a flowchart schematically describing a game service providing method according to an aspect of the presently disclosed embodiment.

FIG. 11 is a flowchart schematically describing a game service providing method according to an aspect of the presently disclosed embodiment.

Referring to FIG. 11, when the card reader 200 is connected to the terminal 500, the card reader 200 transmits card reader recognition information to the terminal 500 (S101). The card reader recognition information may include at least one of card reader identification information, game identification information, and game execution information.

The terminal 500 executes a game according to a user input or game execution information included in card reader recognition information (S103).

When the terminal 500 transmits login information to the server 600 according to the execution of the game (S105), the server 600 extracts latest game execution information according to the login information (S107). The login information includes game identification information, user identification information, and the like. The user identification information may include a user ID, a user password, and the like. The latest game execution information according to the login information may include game execution information at the time of the latest logout before the login information is received.

When the server 600 transmits a latest game execution screen, to which the latest game execution information is reflected, to the terminal 500 (S109), the terminal 500 displays a game service providing screen (S111). According to an aspect of the presently disclosed embodiment, the terminal 500 may provide a game service that has been logged in according to the connection of the card reader 200. Hereinafter, on the assumption that the logged-in game service is provided through the terminal 500, a reader level change method according to an aspect of the presently disclosed embodiment will be described in detail.

Figure 12:
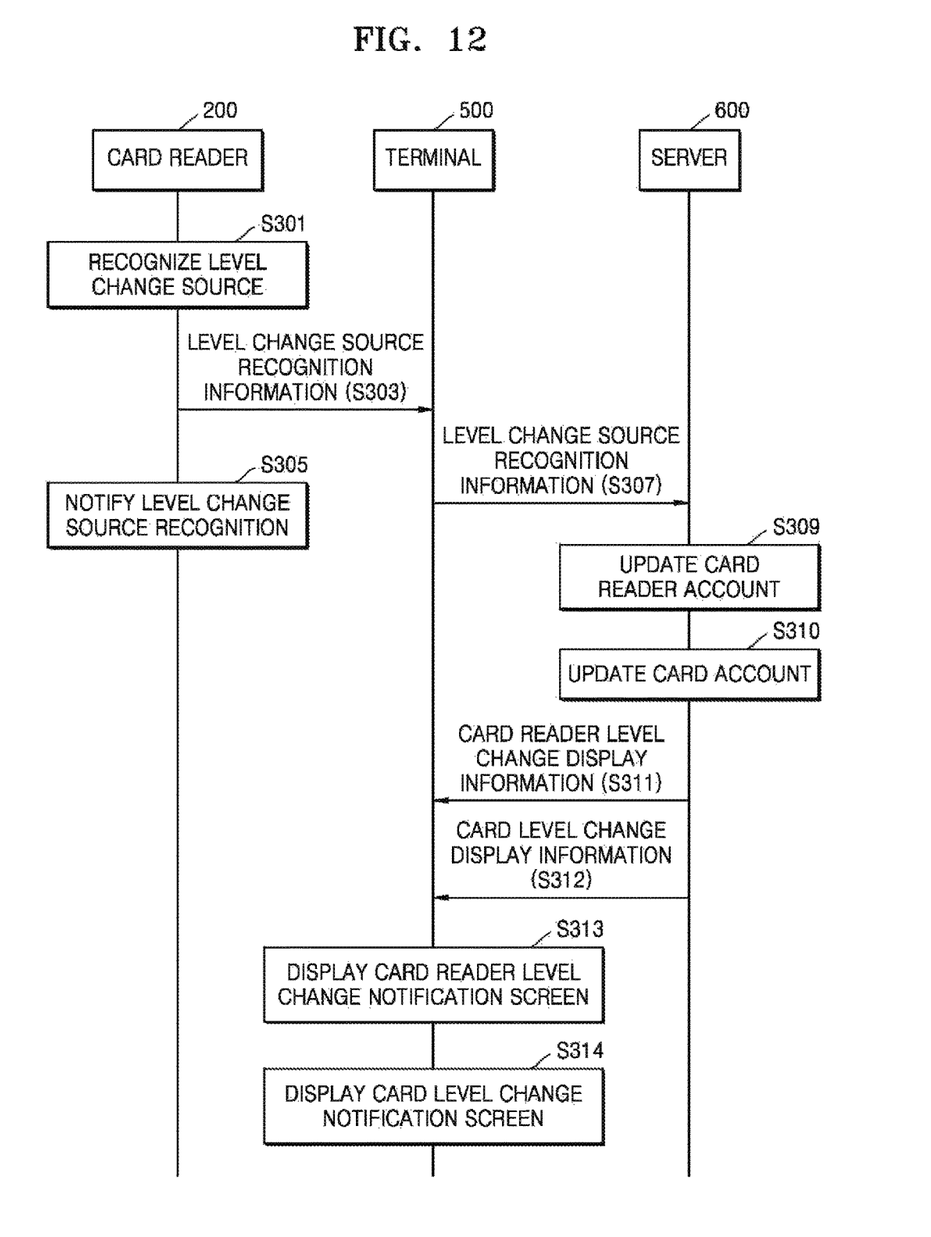
FIG. 12 is a flowchart schematically describing a game service providing method according to another aspect of the presently disclosed embodiment.

FIG. 12 is a flowchart schematically describing a game service providing method according to another aspect of the presently disclosed embodiment.

Referring to FIG. 12, when the card reader 200 recognizes the level change source in a contact manner or a non-contact manner (S301), the card reader 200 transmits level change source recognition information to the terminal 500 (S303). The level change source recognition information may include identification information and number information of the level change source. For example, the card reader 200 may recognize four level-1 change sources at the same time or sequentially within a predetermined period of time, and transmit, to the terminal 500, level change source recognition information including identification information of the level-1 change source and number information of the four same level change sources.

The card reader 200 displays information indicating the recognition of the level change source through the level change source recognition indicators 241 and 242 (S305).

When the level change source recognition information is transmitted to the server 600 through the terminal 500 (S307), the server 600 updates a card reader account (S309). For example, when level change source recognition information of a first card reader is received, the server 600 may change first card reader level information stored in the card reader level information field 1350 to, for example, second card reader level information indicating level 4.

When the level change source is a card that is readable by the card reader 200, the server 600 receiving the level change source recognition information may update a card account (S310). For example, the server 600 may extract the card account 1301 in which the first card number is stored in the card identification information field 1310, based on the level change source recognition information, and acquire the level-1 change source based on the level change source recognition information. As a result of acquiring the level-1 change source from the first card, if the level change source does not remain in the first card any more, the server 600 may newly store second card level information indicating no value as the level change source to the card level information field 1330.

When the server 600 transmits card reader level change display information to the terminal 500 in correspondence to the update of the card reader account (S311), the terminal 500 may display, on the display 540, a card reader level change notification screen to which the card reader level change display information is reflected (S313). The card reader level change notification screen may be display on a part of the game service providing screen or in the form of a popup window, but is not limited thereto.

When the server 600 transmits card level change display information to the terminal 500 in correspondence to the update of the card account (S312), the terminal 500 may display, on the display 540, a card level change notification screen to which the card level change display information is reflected (S314). The card level change notification screen may be display on apart of the game service providing screen or in the form of a popup window, but is not limited thereto.

The game service providing methods according to aspects of the presently disclosed embodiment may be embodied as computer-readable codes on a non-transitory computer-readable recording medium. The computer-readable recording medium may be any recording medium that can store data which is thereafter readable by a computer system. Examples of the computer-readable recording medium include ROM, RAM, CD-ROMs, magnetic tapes, floppy disks, and optical data storage devices. The computer-readable recording medium may also be distributed over network-coupled computer systems so that the computer-readable code is stored and executed by at least one processor in a distributed fashion. Also, functional programs, codes, and code segments for implementing the presently disclosed embodiment may be easily construed by programmers skilled in the art to which the presently disclosed embodiment pertains.

While the technical spirit of the presently disclosed embodiment has been described with reference to embodiments, it will be understood by those of ordinary skill in the art that various modifications and changes can be made thereto without departing from the scope of the presently disclosed embodiment. Therefore, the embodiments disclosed in the presently disclosed embodiment are not intended to limit the scope of the presently disclosed embodiment, but are intended to describe the presently disclosed embodiment. The scope of the technical idea of the presently disclosed embodiment is not limited by these embodiments. The scope of the protection of the presently disclosed embodiment should be construed by the appended claims. All technical ideas within the scope of equivalents thereof should be construed as falling within the scope of the presently disclosed embodiment.

What is claimed is:

1. A game service providing device for changing a level of a reader by using a level change source, the game service providing device comprising:
    a communicator that receives at least one of payment code readout information including unique reader identification information for identifying the reader so as to uniquely identify each reader from each other different reader, reader recognition information of the uniquely identified reader, and level change source recognition information of the level change source for the uniquely identified reader;
    a database that stores at least one of the unique reader identification information and reader level information indicating a current level of the uniquely identified reader communicated to the communicator, the level of the uniquely identified reader being deterministic of a performance of a card in an online game; and
    an account manager that registers a reader account corresponding to the uniquely identified reader communicated to the communicator, in the database based on the payment code readout information, stores the unique reader identification information and first reader level information in a reader identification information field and a reader level information field associated with the reader account, respectively, and changes a level of the uniquely identified reader by changing the first reader level information stored in the reader level information field to second reader level information, different from the first reader level information, based on the reader recognition information and the level change source recognition information communicated to the communicator, each different level of the uniquely identified reader being deterministic for different performance changes of a card in the online game.

2. The game service providing device of claim 1, wherein the first reader level information is default information.

3. A game service providing method of changing a level of a reader by using a level change source, the game service providing method comprising:
    receiving, by a communicator of a game service providing device, payment code readout information including unique reader identification information identifying a reader, so as to uniquely identify each reader from each other different reader;
    registering, by an account manager of the game service providing device, a reader account corresponding to the uniquely identified reader received by the communicator, in a database of the game service providing device based on the payment code readout information;
    storing, by the account manager, the reader identification information of the uniquely identified reader and reader level information in a reader identification information field and a reader level information field associated with the reader account of the database, respectively, the level of the uniquely identified reader being deterministic of a performance of a game card in an online game;
    receiving, by the communicator, reader recognition information of the uniquely identified reader;
    receiving, by the communicator, level change source recognition information of the level change source;
    changing, by the account manager, a level of the uniquely identified reader by changing the reader level information stored in the reader level information field from a first reader level to a second reader level different from the first reader level based on the reader recognition information and the level change source recognition information received by the communicator, each different level of the uniquely identified reader being deterministic for different performance changes of a card in the online game; and
    generating, by the account manager, reader level change display information.

4. The game service providing method of claim 3, wherein the first reader level information is default information.

5. A computer program recorded on a medium, which, when executed by a computer, performs the method of claim 3.

* * * * *